United States Patent [19]

Salvucci, Sr.

[11] Patent Number: 5,071,148
[45] Date of Patent: Dec. 10, 1991

[54] CYLINDER CART HAVING GAUGE GUARD

[76] Inventor: Frank S. Salvucci, Sr., P.O. Box 1462, Delano, Calif. 93215

[21] Appl. No.: 649,720

[22] Filed: Feb. 1, 1991

[51] Int. Cl.$^5$ .................................................. B62B 1/14
[52] U.S. Cl. ............................... 280/47.24; 280/47.26; 137/382; 220/724; D12/14
[58] Field of Search .............. 280/47.19, 47.24, 47.26, 280/47.28, 47.33, 97.5, 79.6, 47.27; 137/382; 220/85 P; D12/14

[56] References Cited

U.S. PATENT DOCUMENTS

| D. 157,589 | 3/1950 | Hartenbach | 280/47.19 X |
|---|---|---|---|
| D. 174,418 | 4/1955 | Ewing et al. | 280/47.24 X |
| D. 273,510 | 4/1984 | Mayor | 220/85 P X |
| D. 290,285 | 6/1987 | Goode et al. | D23/206 |
| 1,244,030 | 10/1017 | Cave | 280/47.26 X |
| 1,661,498 | 3/1928 | Peck | 280/47.26 X |
| 2,667,397 | 1/1954 | Hallisey | 280/47.26 X |
| 3,064,991 | 11/1962 | Huthsing, Jr. | 280/47.24 |
| 3,503,536 | 3/1970 | Woerner et al. | 220/85 P |
| 3,958,716 | 5/1976 | Korte | 220/85 P X |
| 3,963,144 | 6/1976 | Berwald | 220/85 P |
| 3,964,508 | 6/1976 | Miller | 220/85 P X |
| 4,103,806 | 8/1978 | White | 220/85 P X |
| 4,109,692 | 8/1978 | Brown | 220/85 P X |
| 4,215,581 | 8/1980 | Bolick et al. | 137/382 X |
| 4,352,370 | 10/1982 | Childress | 220/85 P X |
| 4,389,890 | 6/1983 | Bolick et al. | 137/382 X |
| 4,420,013 | 12/1983 | BiBlasio | 220/85 P X |
| 4,600,033 | 7/1986 | Baron | 220/85 P X |
| 4,625,949 | 12/1986 | Walker | 220/47.19 X |
| 4,989,291 | 2/1991 | Parent | 280/47.19 |

Primary Examiner—Andres Kashnikow
Assistant Examiner—Brian L. Johnson
Attorney, Agent, or Firm—Richard C. Litman

[57] ABSTRACT

A gas cylinder cart having an integrally mounted guard device for protecting a regulator connector with a gas cylinder when the gas cylinder is mounted on the cart. The arrangement allows handling of the gas cylinder when disconnected from the cart without damage to the regulator which remains mounted on the cart. In a second embodiment, a protective bar extends from the guard device to surround the gas cylinder including a block valve and a yoke assembly mounted on the cylinder to protect these elements from impact forces. In a third embodiment the regulator is mounted directly on the gas cylinder with the guard mounted on the cart in a manner to protect the cylinder and regulator from impact forces. In the first two embodiments the guard is located on the rear of a cart handle while in the third embodiment the guard is located on the front of the cart handle.

5 Claims, 4 Drawing Sheets

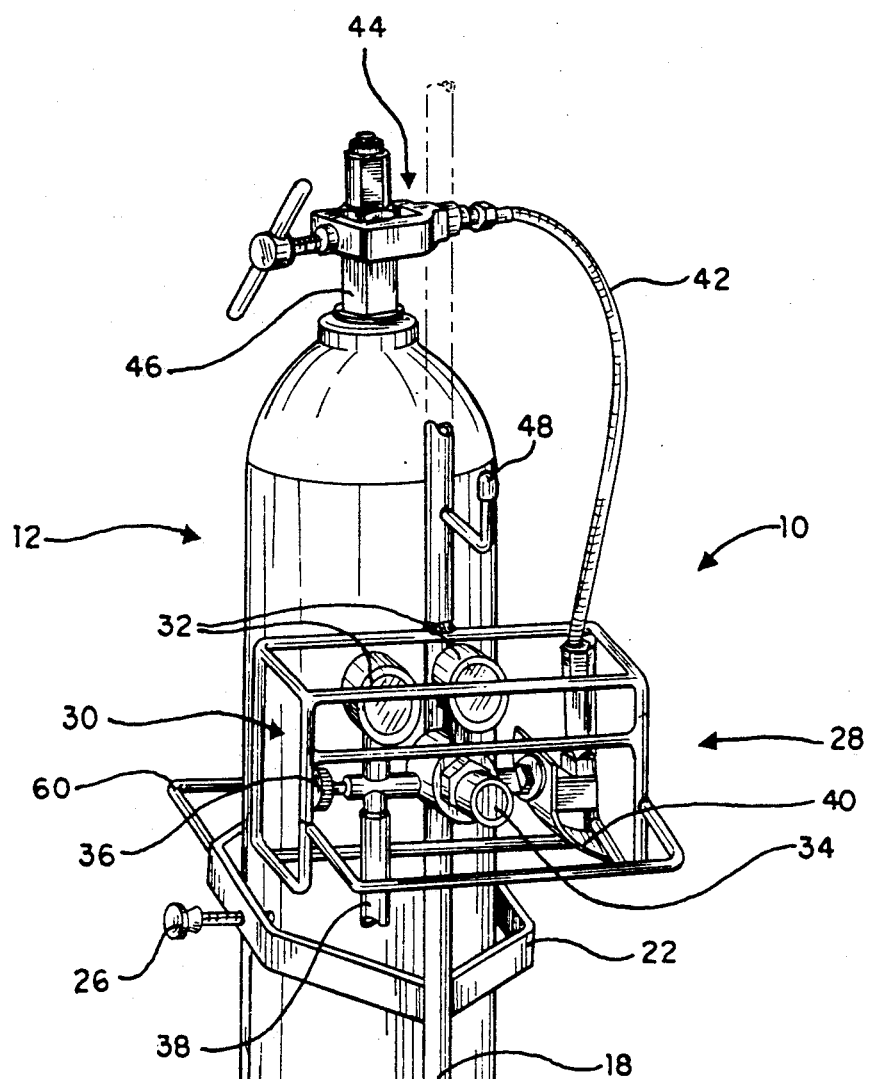
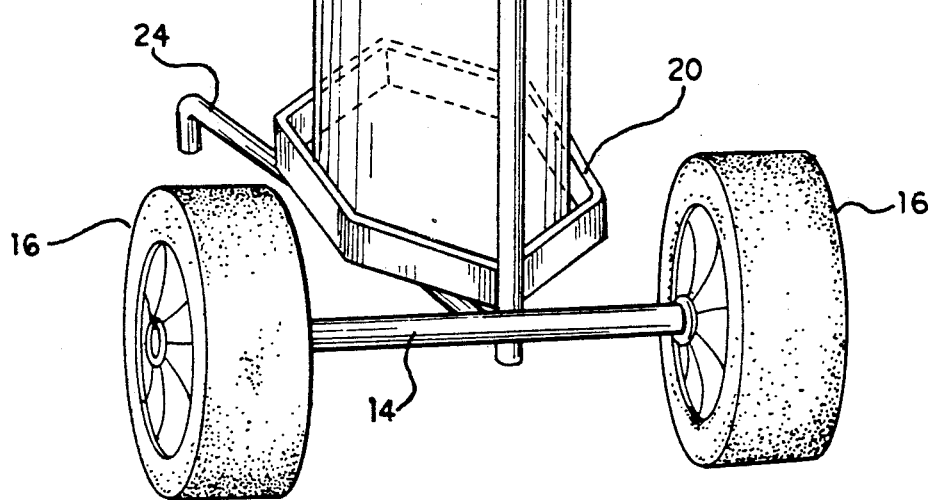
FIG. 1

CYLINDER CART HAVING GAUGE GUARD

BACKGROUND OF THE INVENTION

FIELD OF THE INVENTION

The present invention relates to a gas cylinder cart for transporting gas cylinders, the cart having a valve and gauge assembly mounted thereon for connection to a gas cylinder carried by the cart, the cart also having a cage assembly integral therewith for protecting the valve and gauge assembly from inadvertent damage. In a second embodiment the valve and gauge assembly is mounted on the gas cylinder as in the prior art. The cage assembly protecting the valve and gauge assembly in the second embodiment is suitably mounted on a cart as in the first embodiment, thereby providing a means to protect the valve and gauge assembly from inadvertent damage during transport and a means for holding the cylinder in an upright position when not being transported.

In the field of gas cylinders, and especially those used as sources of medical oxygen supply, current cylinder-handling practice invokes problems in two areas. The first is that of personal safety.

The enormous pressure to which gas cylinders are routinely subjected has the potential of allowing a broken cylinder to simulate a missile or torpedo. Cylinders are typically loaded to 2,250 psi, in volumes prior to compression ranging from 18 to 244 or even 330 cubic feet. It is considered possible for such a runaway cylinder to be able to penetrate a "cinder block" wall. It is also possible for a cylinder to move about randomly in the manner of a child's balloon suddenly released, propelled by escaping air. In this case, even if the heavy cylinder did not leave the ground or floor level, it could break the limbs of people in the vicinity.

In the event of a pinhole developing in a cylinder, the ensuing jet of gas can be of sufficient velocity to cut through many materials including human bodies. This is especially a threat to the eyes or face of a user, since a user will from time to time work near the valve or other components. A small-magnitude leak may be nearly silent and not alert the user, who may well be an elderly or partially incapacitated individual.

The contained gas in medical situations is usually oxygen. An escape of pure oxygen increases the hazard of flammability in the presence of combustible material.

A gas cylinder, particularly if out of control, may be a source of ignition. Much of the assembly is of steel, which may cause sparks if striking stone, concrete, or the like.

In addition to safety considerations, there is considerable economic loss due to mishandling of gas cylinders. It is believed that damage done to regulators alone is in the millions of dollars. It is likely that in excess of two million such cylinders are in use today, typically by elderly possibly indigent, frail users. Considerable expense is incurred by federal and state governments in their respective social medicare programs for repair of damaged regulators. It is further suspected that many of these disadvantaged users continue to use damaged regulators possibly for fear of losing benefits or from ignorance. This may result in excessive pressure during use or in loss due to leakage unbeknownst to the user, possibly resulting in unexpected depletion of the critical oxygen supply.

SUMMARY AND OBJECTS OF THE INVENTION

The present invention addresses the above and other considerations. According to one preferred embodiment of the invention, the valve and gauge assembly is mounted directly upon a cart designed to hold and transport a gas cylinder, the valve and gauge assembly being connected to the cylinder through a yoke assembly and flexible hose. The cart has integral therewith a guard structure which protects the valve and gauge assembly from inadvertent damage should the cart accidentally be tipped or knocked over by the user.

The disconnection and separation of the cylinder from the cart will leave fewer projecting components on the cylinder vulnerable to damage. The location of the manifold and its components remote from the cylinder permits the conventional check valve located internally of the block valve disposed on the cylinder to be used to full advantage. This check valve permits communication of the pressurized supply with the manifold only when the hose connection is secure. In the prior art, the hose fitting to block valve connection is not broken when a cylinder is renewed. The present invention causes this connection to be severed when removing a cylinder from the cart, as for replacement; thus, this safety feature comes into play during routine service. If a user drops the yoke assembly, it falls harmlessly aside; no regulator damage will occur. The regulator is now located to the rear of the cart where it is less exposed.

This is unlike existing regulator protection schemes since the most delicate components are mounted on thee cart and are isolated from the cylinder. Further, while guards may be clamped onto a cylinder as shown by the prior art such attachment is not fail-safe.

In the present invention, the cylinder can't fall out of the cart while in use. If the cylinder does fall (as during replacement or renewal) there are minimal protrusions (such as a manifold, gauges, or the like) to strike the floor, thereby decreasing chances of damage or enhancing the "lever" effect (i.e., the longer the projection from the cylinder, the more likely bending will take place at the point of attachment to the cylinder). Two prior art references, U.S. Pat. No. 4,389,890 issued to Stephen M. Bollick and John O. Vought and U.S. Pat. No. 4,600,033 issued to Michael Baron, explicitly teach carrying a cylinder around while not contained in a cart, having a valve and gauge assembly mounted thereon.

Fire department and federal and state OSHA cylinder standards require a gas cylinder to be contained by a bracket, wall bracket, cart or stand when in use. The instant invention virtually necessitates compliance with this requirement since the critical regulator assembly is integral with the cart.

Two bodies (National Welding Supply Association and American Welding Supply Association) recognize some or all of the hazards identified above, but little has been done to address them. All of the prior art disclosures known to the inventor involve the mounting of the regulator assembly, including valves and gauges, and the protective guards therefor directly on the gas cylinder. In addition to the patents to Bollick et al. and Baron these disclosures include U.S. Pat. No. 4,109,692 issued to Roland H. Brown, U.S. Pat. No. 4,420,013 issued to Alfonzo W. DiBlasio, and U.S. Design Pat. No. 290,285 issued to Goode et al.

In another preferred embodiment, the regulator assembly is attached to the gas cylinder as in the prior art. A transporting cart having a gauge guard integral therewith suitably located on the front of the cart is provided to protect the regulator assembly from inadvertent damage, the gauge guard having means integral therewith to prevent rotation or canting of the valve and gauge assembly should the cart inadvertently fall over while carrying the gas cylinder having the regulator assembly mounted thereon.

It is an object of the invention to provide gas cylinders with a cart having the regulator assembly, including valves and gauges, mounted integrally thereon.

It is another object of the invention to provide a gas cylinder cart with an integral guard assembly thereon to protect the regulator assembly mounted thereon.

It is still another object of the invention to provide a gas cylinder cart with an integral guard assembly thereof to protect a regulator assembly mounted directly on a gas cylinder.

Other objects, features and advantages of this invention will be apparent from the following detailed description and the appended claims, reference being had to the accompanying drawings forming a part of the specification, wherein like reference numerals designate corresponding parts of the several views.

BRIEF DESCRIPTION OF THE DRAWINGS

FIG. 1 is a perspective view of the cylinder cart having a regulator assembly and gauge guard integral therewith and a gas cylinder carried thereby;

DETAILED DESCRIPTION OF PREFERRED EMBODIMENT

Figure 2:
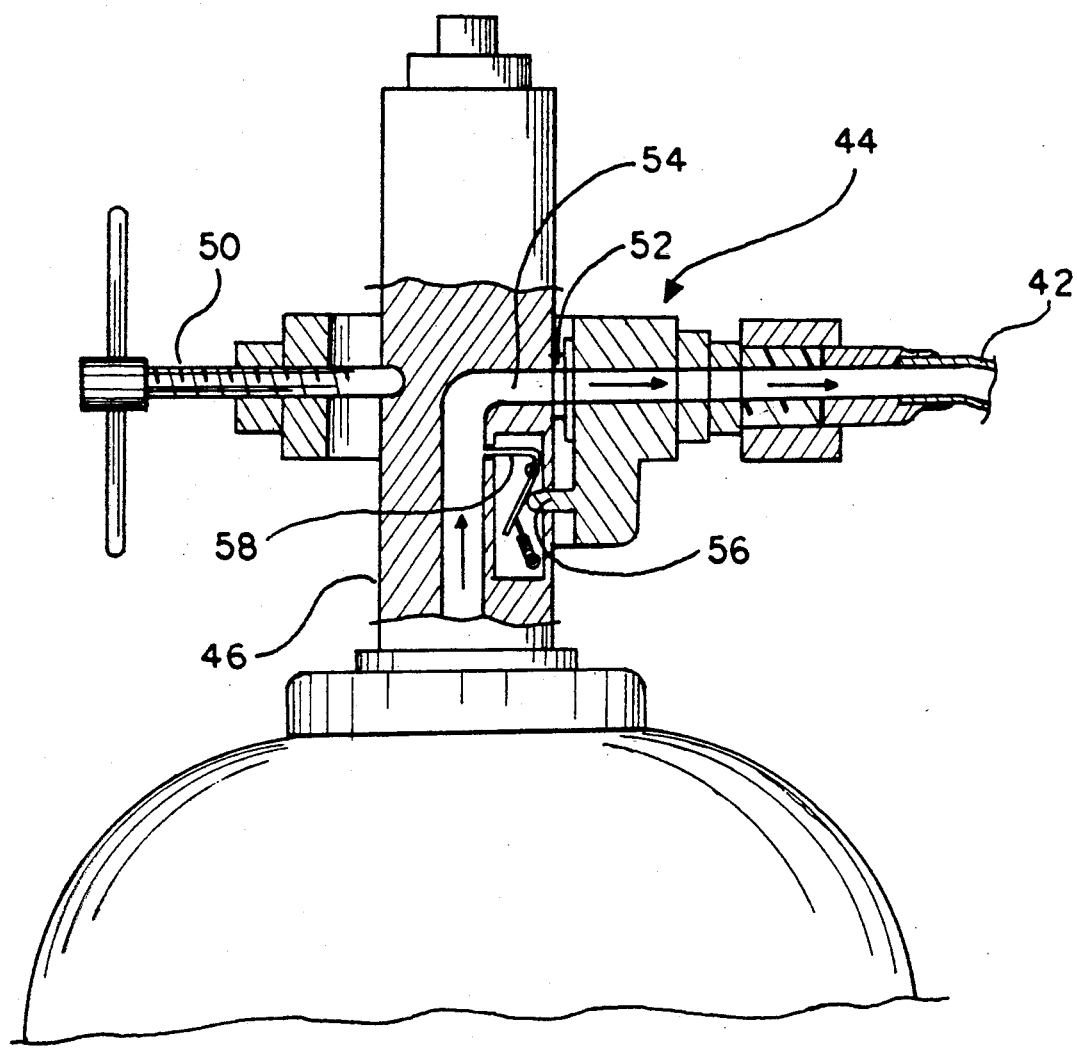
FIG. 2 is a cross-section view of the yoke assembly mounted on a block valve attached to the gas cylinder.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not limitation In FIG. 1, there is shown a gas cylinder cart 10 carrying a conventional gas cylinder 12. Cart 10 comprises an axle 14 mounting two wheels 16 to allow the cart to be easily transported. Suitably attached to axle 14 as by welding is a vertical bar 18 serving as a handle. Spaced vertically apart along bar 18 are two hexagonal rings 20 and 22 for supporting the gas cylinder 12 vertically on the cart 10. The base of the cylinder rests on two legs 24 (only one shown in FIG. 1 to simplify the drawing) which are suitably attached to bar 18 and ring 20 in an angled fashion, the legs 24 being provided to allow the cart 10 and the cylinder 12 carried thereby to stand upright when not being transported. The upper ring 22 contain a locking screw 26 which bears against cylinder 12 when tightened to retain cylinder 12 within the cart, and a bar 60 integral with ring 22 provided to protect gas cylinder 12 from damage in the event cart 10 is bumped or falls over in the forward direction.

Also integral with the vertical bar 18 as by welding is a guard 28 which mounts a regulator assembly 30 therein. Regulator assembly 30 comprises a plurality of gauges 32 a manifold 34, valve means 36 regulating the flow of gas from cylinder 12 to exit hose 38 which in turn may be connected, by way of example only, to a face mask or the like. Guard 28 and regulator assembly 30 are mounted to the rear of cart 10 on vertical bar 18.

Regulator assembly 30 is mounted within guard 28 by means of an integral plate 40. The purpose of guard 28 is to protect the component parts of the regulator assembly 30 from damage in the event the cart 10 is bumped or tipped over. The regulator assembly 30 is connected to the gas cylinder 12 by means of a flexible hose 42 and yoke assembly 44. Yoke assembly 44 is mounted on a block valve 46 which is screwed into the top of cylinder 12. Connected to vertical bar 18 as by welding is a hook 48 which may be used to support hose 42 when yoke assembly 44 is disconnected from block valve 46 as, for example, when an exhausted gas cylinder 12 is to be replaced by another cylinder 12.

FIG. 2 is a cross-section view of the yoke assembly 44 connected to block valve 46. Yoke assembly 44 is secured on block valve 46 by means of a turn screw 50 which tightens a sealing washer 52 against block 46, thereby connecting opening 54 to flexible hose 42. Yoke assembly 44 has integral therewith a pair of projections 56 (only one shown in FIG. 2) which open a conventional spring-based check valve 58 when turn screw 50 is tightened against block valve 46. When yoke assembly 44 is disconnected from block valve 46, check valve 58 seals the opening 54 to prevent the loss of gas from cylinder 12.

By mounting the regulator assembly 30 and the guard 28 on the cylinder cart 10 rather than directly on gas cylinder 12 as in the prior art, the chances of inadvertently damaging the valves, gauges and manifold when handling cylinder 12 are substantially reduced.

Figure 3:
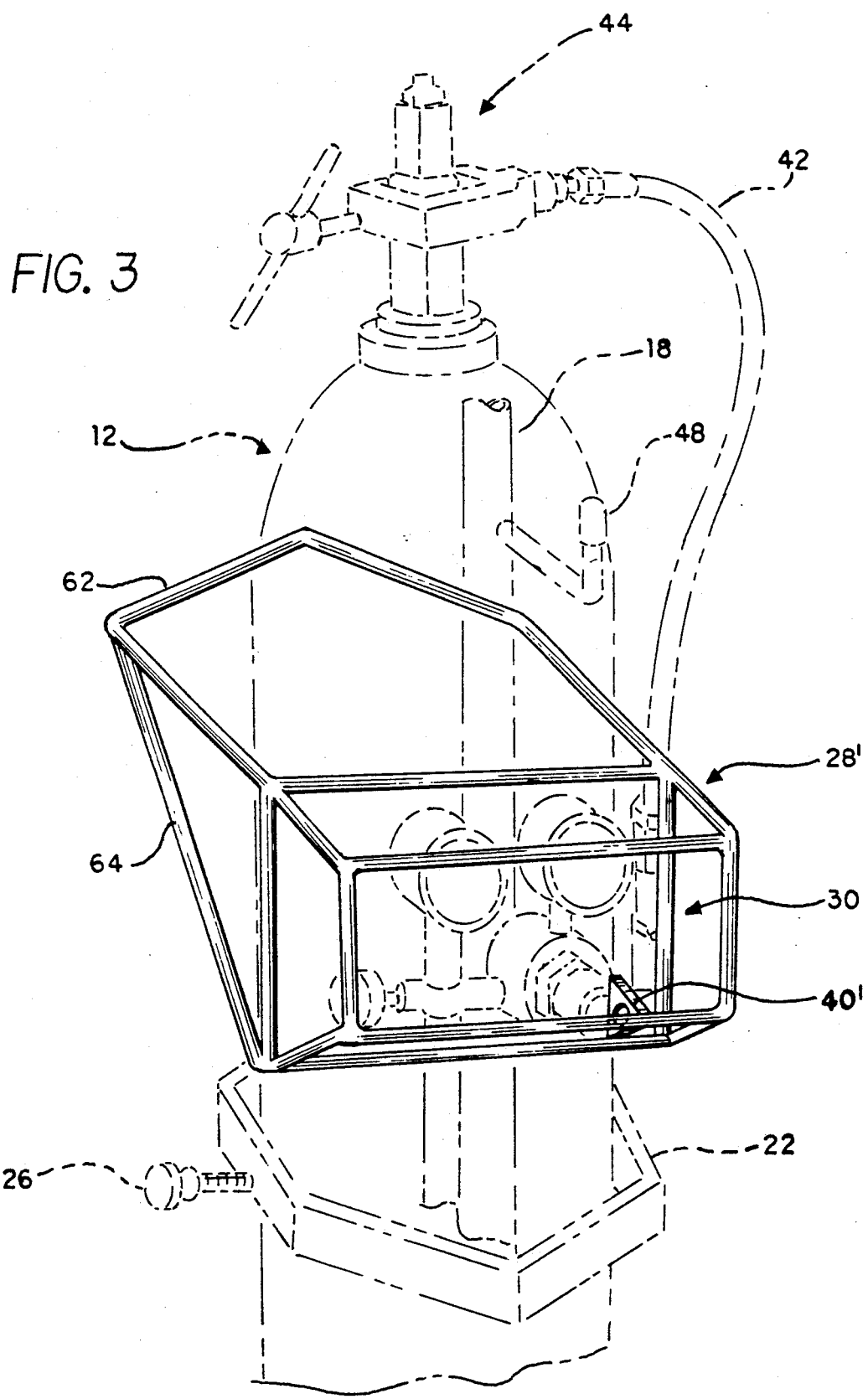
FIG. 3 is a perspective view of a modification of the gauge guard shown in FIGS. 1 and 2.

FIG. 3 shows a modification of gauge guard 28 shown in FIG. 1, identified by reference numeral 28 . Shown in phantom in FIG. 3 are gas cylinder 12, bar or handle 18, upper hexagonal ring 22, looking screw 26, regulator assembly 30, flexible hose 42, yoke assembly 44, block valve 46 and hook 48, all of which are the same as in FIG. 1. As in the FIG. 1 embodiment, regulator assembly 30 is mounted within guard 28' by means of an integral plate 40 . Gauge guard 28' includes a protective bar 62 which surrounds gas cylinder 12 and block valve 46 with yoke assembly 44 when fully inserted in the cart, bar 62 being supported in the horizontal position by side bars 64, only one of which is shown in FIG. 3. Bar 62 provides additional protection for gas cylinder 12 and the yoke and block valve assembly thereon against bumps or inadvertent jarring should cart 10 be tipped over.

Figure 4:
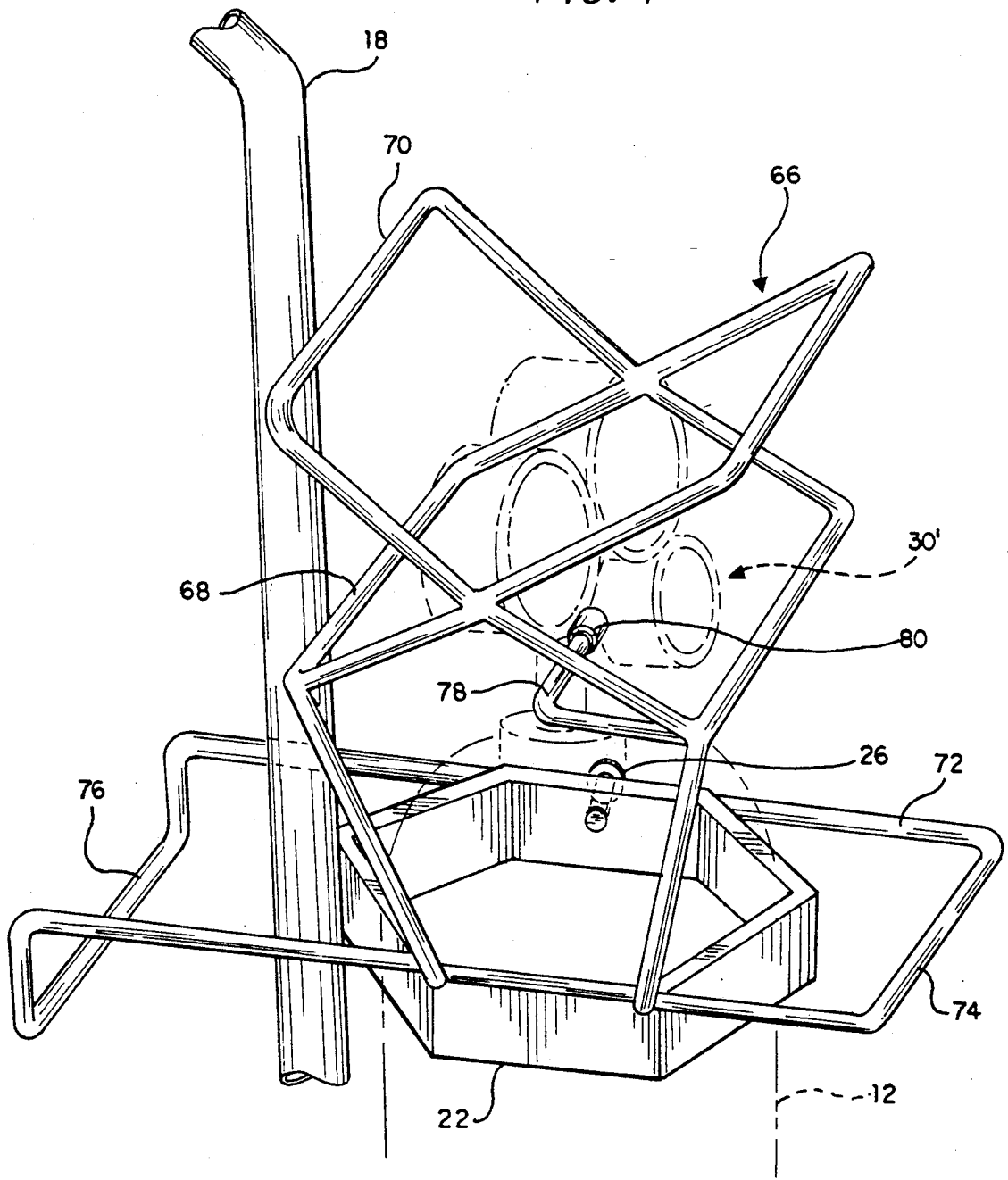
FIG. 4 is a perspective partial view of a cylinder cart having a gauge guard for protecting a regulator assembly mounted directly on a gas cylinder.

FIG. 4 shows a preferred embodiment for use with a gas cylinder 12 having regulator assembly 30' mounted directly on gas cylinder 12. Vertical bar or handle 18, upper hexagonal ring 22, and locking screw 26 are the same as in FIG. 1. Gauge guard 66 is fixedly mounted on upper hexagonal ring 22, at the front of vertical bar 18, as by welding. Crossbars such as bars 68 and 70 may also be suitably attached to vertical bar 18.

Located at the bottom of gauge guard 66 is a base 72 attached to hexagonal ring 22 as by welding. Base 72 is formed of tubing bent into a rectangular shape and extending to the front and rear a distance greater than the depth of guard cage 66, the outer ends 74 and 76 serving to protect regulator 30' against damage from inadvertent tipping or bumping of the cart.

Integral with guard cage 66 is an L-shaped bar 78 having a tip cover 80 thereon located so as to prevent rotation or canting of regulator assembly 30' due to an impact generated by a falling cart. Such rotation would tend to loosen the connection between the regulator assembly 30 and gas cylinder 12, allowing the gas therein to escape, perhaps violently if the impact is sufficiently hard.

While it will be apparent that the preferred embodiment of the invention herein disclosed is well-calculated to fulfill the above-stated objects, it will be appreciated that the invention is susceptible to modification, variation and change without departing from the proper scope or fair meaning of the subjoined claims.

I claim:

1. Cart means for holding and transporting gas cylinder means, said cart means comprising:
   wheel means for transporting the cart means from one location to another;
   a single vertically oriented handle means connected to the wheel means;
   supporting means connected to said handle means for mounting gas cylinder means on said cart means;
   guard means fixedly mounted on said handle means;
   regulator means mounted within said guard means for regulating gas flow from said gas cylinder means, said guard means protecting said regulating means from inadvertent damage;
   connecting means for joining said regulator means to said gas cylinder means when said gas cylinder means is mounted upon said supporting means;
   leg means attached to said handle means to provide vertical stability to said cart means when said cart means is at rest and to provide a base support upon which said gas cylinder means rests when mounted upon said support means;
   said supporting means for mounting a gas cylinder including mounting means being mounted on said handle means and said leg means for maintaining said gas cylinder means in a vertical position when mounted on said cart means;
   said mounting means including a continuous ring that encircles said gas cylinder means when said gas cylinder means is mounted on said cart means;
   whereby gas may flow from said gas cylinder means to said regulator means when said regulator means is connected to said gas cylinder, and said gas cylinder means may be transported and used without inadvertent damage to the regulator means.

2. Cart means as in claim 1, further comprising:
   hook means integral with said handle means for supporting said hose means when said yoke means is disconnected from said block valve means.

3. Cart means as in claim 1, wherein:
   said regulator means comprises manifold means, gauge means connected to said manifold means, valve means connected to said manifold means to regulate the flow of gas through said manifold means, and exit hose means connected to said manifold means; whereby
   the flow of gas passing from the gas cylinder means to the exit hose means may be regulated by the regulator means.

4. Cart means as in claim 1, wherein:
   said regulator means is mounted on plate means integral with said guard means.

5. Cart means as in claim 1 further comprising:
   yoke means adapted to be connected to block valve means attached to said gas cylinder means;
   said connecting means comprising flexible hose means connected to said regulator means and to said yoke means;
   said yoke means including washer means alignable with gas exit opening means in said block valve means;
   turn screw means for tightening said washer means against said opening means to provide a tight seal, said opening means being connected through said washer means to said flexible hose means; and
   projection means mounted on said yoke means to engage check valve means disposed within said block valve to open said check valve means when said turn screw means is tightened, said check valve means being closed when said yoke means is disconnected from said block valve means.

* * * * *